(12) United States Patent
Takarada

(10) Patent No.: US 8,443,112 B2
(45) Date of Patent: May 14, 2013

(54) INPUT/OUTPUT SIGNAL CONTROLLER AND INPUT/OUTPUT SIGNAL CONTROL SYSTEM EMPLOYING THE INPUT/OUTPUT CONTROLLER

(75) Inventor: Mitsuo Takarada, Saitama (JP)

(73) Assignee: B & Plus K.K., Saitama (JP)

(*) Notice: Subject to any disclaimer, the term of this patent is extended or adjusted under 35 U.S.C. 154(b) by 233 days.

(21) Appl. No.: 13/121,828

(22) PCT Filed: Mar. 24, 2009

(86) PCT No.: PCT/JP2009/055764
§ 371 (c)(1),
(2), (4) Date: Mar. 30, 2011

(87) PCT Pub. No.: WO2010/109590
PCT Pub. Date: Sep. 30, 2010

(65) Prior Publication Data
US 2011/0182369 A1    Jul. 28, 2011

(51) Int. Cl.
*G06F 3/00* (2006.01)

(52) U.S. Cl.
USPC ............ 710/5; 710/1; 710/3; 710/4; 710/7; 710/8; 710/12; 710/13; 710/20; 710/29; 710/30; 710/31; 710/33; 710/36

(58) Field of Classification Search ............ 710/1, 3, 710/4, 5, 7, 8, 12, 13, 20, 29, 30, 31, 33, 710/36
See application file for complete search history.

(56) References Cited

U.S. PATENT DOCUMENTS

| | | | |
|---|---|---|---|
| 4,496,541 A | 1/1985 | Huang et al. | |
| 6,594,768 B1* | 7/2003 | Ono et al. | 713/300 |
| 7,933,517 B2* | 4/2011 | Ye et al. | 398/3 |
| 2004/0148441 A1* | 7/2004 | Kanda et al. | 710/1 |
| 2005/0207504 A1* | 9/2005 | Kusumoto et al. | 375/257 |
| 2011/0022789 A1* | 1/2011 | Fujimoto | 711/103 |

FOREIGN PATENT DOCUMENTS

| | | |
|---|---|---|
| JP | 61-089741 A | 5/1986 |
| JP | 5-153099 A | 6/1993 |
| JP | 10-294750 A | 11/1998 |
| JP | 2002-176427 A | 6/2002 |

OTHER PUBLICATIONS

International Search Report of PCT/JP2009/055764, mailing date Apr. 21, 2009.

* cited by examiner

*Primary Examiner* — Idriss N Alrobaye
*Assistant Examiner* — Jasjit Vidwan
(74) *Attorney, Agent, or Firm* — Westerman, Hattori, Daniels & Adrian, LLP

(57) ABSTRACT

A transmitting section 7a outputs a transmission signal to the side of a transmission line 1. A first switching section Qa1 outputs the transmission signal to the transmission line 1. A second switching section Qa2 outputs the transmission signal from the transmission line 1. A receiving section 9a receives the transmission signal from the transmission line 1. A first detecting section 13a detects the transmission signal flowing through the first switching section Qa1. A second detecting section 19a detects the transmission signal flowing through the second switching section Qa2. When the transmission signal from the transmitting section 7a is not detected at both the first and second detecting sections 13a and 19a, a selecting section 15a selects the receiving section 9a and outputs a reception signal.

7 Claims, 7 Drawing Sheets

FIG.6
A
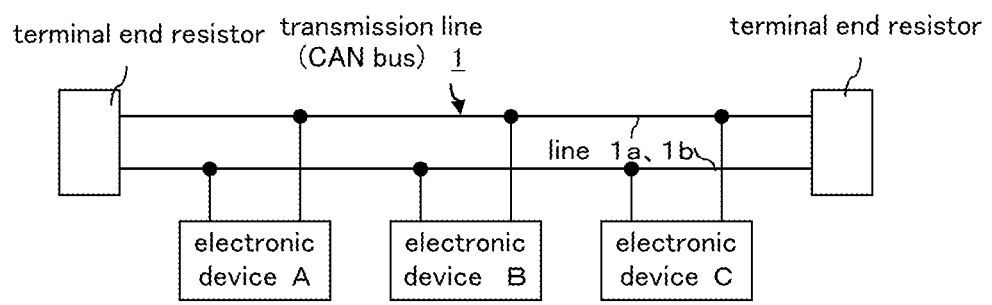
B
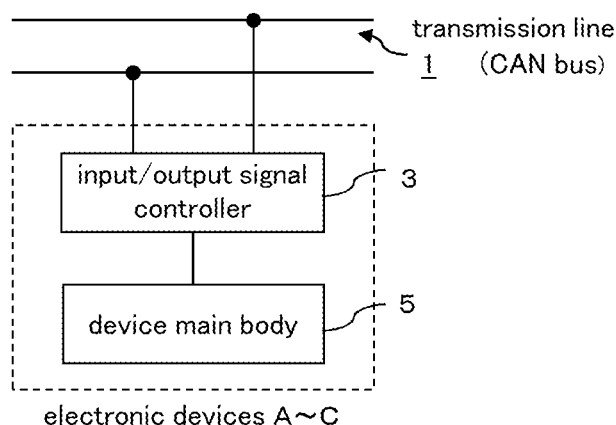

US 8,443,112 B2

INPUT/OUTPUT SIGNAL CONTROLLER AND INPUT/OUTPUT SIGNAL CONTROL SYSTEM EMPLOYING THE INPUT/OUTPUT CONTROLLER

TECHNICAL FIELD

The present invention relates to an input/output signal controller and an input/output signal control system employing the input/output signal controller, and particularly relates to an improvement of the input/output signal controller and the input/output signal control system suitable for being mounted on an electronic device, etc., connected to, for example, a bidirectional transmission line such as CAN (Controller Area Network) bus.

DESCRIPTION OF THE RELATED ART

In recent years, as shown in FIG. 6A, in an electronic control system such as a vehicle, there is provided a structure that a bidirectional communication of a transmission signal is carried out among electronic devices A to C, via 2-wire transmission line 1, with both terminal ends terminated by terminating resistors r1 and r2. Particularly, the transmission line 1 in such a system is called a CAN bus.

In order to carry out bidirectional communication of the transmission signal via the transmission line 1 between each one of the electronic devices A to C and other electronic devices A to C via the transmission line 1, for example, as shown in FIG. 6B, the electronic devices A to C respectively comprise an input/output signal controller 3 that performs input/output control of the transmission signal to the transmission line 1; and a device main body 5 that outputs the transmission signal to the input/output signal controller 3 and performs control processing of each part of a vehicle based on the transmission signal from the input/output signal controller 3.

For example as shown in FIG. 7, in the input/output signal controller 3, the source of a FET transistor that forms a switching section Q1 is connected to a terminal P1 connected to a high potential side of a power supply section not shown, and a drain of this transistor is connected in a forward direction to a line 1a, which is one of the transmission line 1, via a protection diode D1.

The drain of the FET transistor that forms a switching section Q2 is connected in a forward direction via a protection diode D2, from the other line 1b of the transmission line 1, and the source of this transistor is connected to a low potential side of the power supply section from a terminal P2.

Further, a transmitting section 7 for transmitting the transmission signal from the device main body 5 to the side of the transmission line 1, is connected to gates of the switching sections Q1 and Q2, and a receiving section 9 that receives the transmission signal and outputs it to the device main body 5, is connected to the transmission line 1.

The transmitting section 7 and the receiving section 9 are operated by a power supply from the power supply section from the terminals P1 and P2. Particularly, the receiving section 9 outputs an output ("H" level) state of the transmission signal from the electronic devices A to C (called a "dominant state" in many cases) and a non-output ("L level") state (called a ("recessive state" in many cases), to the device main body 5 as they are.

In the input/output signal controller 3 with this structure, when the transmission signal from the device main body 5 is inputted into the transmitting section 7, the switching sections Q1 and Q2 are set in an on (ON) operation by the transmitting section 7 based on the transmission signal, so that a battery-powered current from the power supply section flows to the side of the transmission line 1 via the terminal P1, the switching section Q1, and the protection diode D1. Then, the battery-powered current from the side of the transmission line 1 flows to the protection diode D2, the switching section Q2, and the terminal P2, to thereby transmit the transmission signal to the side of the transmission line 1, and set the transmission line 1 in the "dominant state".

Meanwhile, in FIG. 7, when the transmission line 1 is set in the "dominant state" by other electronic devices A to C, the transmission signal is inputted into the receiving section 9 from the side of the transmission line 1, and the receiving section 9 outputs this transmission signal to the device main body 5.

Incidentally, as a general technique of this kind, for example, the technique of patent document 1 (Japanese Patent Laid Open Publication No. 2002-176427) can be given.
(Patent Document 1)
Japanese Patent Laid Open Publication No. 2002-176427

DISCLOSURE OF THE INVENTION

Problems to be Solved by the Invention

However, in the aforementioned input/output signal controller 3, when the switching sections Q1 and Q2 are set in the "ON" operation, to thereby set the transmission line 1 in the "dominant state" and transmit the transmission signal to the transmission line 1, the transmission signal transmitted from the transmitting section 7 is also inputted into the receiving section 9. Therefore, there is a necessity for judging whether or not the transmission signal received by the receiving section 9 is a signal from the electronic devices A to C of an own machine, thus requiring a special structure at the side of the device main body 5 to prevent a malfunction.

Further, as shown in FIG. 6, when a plurality of electronic devices A to C are connected to the transmission line 1, such electronic devices A to C are operated by receiving power supply by a main power supply line from a common main power supply section (not shown in FIG. 6). However, there is a possibility that the malfunction is generated due to an unexpected voltage drop caused by an internal resistor of the main power supply line during power supplying operation. Thus, a special devising is required.

In order to solve the above-described problems, the present invention is provided, and an object of the present invention is to provide the input/output signal controller capable of detecting the transmission signal only from the side of the electronic device of the own machine and facilitating a prevention of the malfunction at the side of the own machine, and the input/output signal control system using the same.

Means for Solving the Problems

In order to solve the above-described problems, an input/output signal controller according to claim 1 of the present invention comprises:
a transmitting section that outputs a transmission signal to the side of a 2-wire transmission line connected to terminal end resistors of both ends;
a first switching section that outputs the transmission signal transmitted from the transmitting section by switching ON/OFF of a battery power supplied from a unit power supply section, being the first switching section connected between a high potential side of the unit power supply section and one of the transmission line;

a second switching section that outputs from the transmission line the transmission signal transmitted from the transmitting section by switching ON/OFF of the supplied battery power simultaneously with the first switching section, being the second switching section connected between the other line of the transmission line and a low potential side of the unit power supply section;

a receiving section that receives the transmission signal from the transmission line;

a first detecting section connected between the high potential side of the unit power supply section and one of the transmission line, for detecting an output of the transmission signal from the transmitting section flowing through the first switching section;

a second detecting section connected between the other line of the transmission line and the low potential side of the unit power supply section, for detecting the output of the transmission signal from the transmitting section flowing through the second switching section; and a selecting section that selects the receiving section when the output of the transmission signal from the transmitting section is not detected by either one of the first and second detecting sections.

In the input/output signal controller according to claim 2 of the present invention, the first and second detecting sections have resistors connected in series between the unit power supply section and the first or second switching section.

In the input/output signal controller according to claim 3 of the present invention, the first and second detecting sections control a selecting section so as not to select the receiving section when both end voltages are highest, which are the both end voltages of the first and second detecting sections when the transmission signal is outputted from the transmitting section.

In the input/output signal controller according to claim 4 of the present invention, the transmission line is a wired transmission line connected to a wireless transmission line.

In the input/output signal controller according to claim 5 of the present invention, the unit power supply section supplies electric power based on a main power supply from a main power supply line extending from a main power supply section.

In an input/output signal control system according to claim 6 of the present invention, a plurality of input/output signal controllers of claim 5 are connected to the main power supply line in parallel.

In the input/output signal control system according to claim 7 of the present invention, the plurality of input/output signal controllers are dispersedly connected to the main power supply line in parallel.

ADVANTAGE OF THE INVENTION

According to the input/output signal controller of the present invention, when the transmission signal is outputted to the transmission line by setting the first and second switching sections in ON/OFF operation by the transmitting section, the first and second detecting sections detect an output of the transmission signal flowing through the first and second switching sections. However, when the output of the transmission signal is not detected by the first and second detecting sections, the selecting section selects the receiving section so that a received signal can be outputted. Therefore, if the received transmission signal is transmitted only from the electronic device of the own machine, the first and second detecting sections detect this transmission signal and the selecting section does not allow the received signal to be outputted, thus surely preventing the malfunction at the side of the own machine.

According to the input/output signal controller of the present invention, the first and second detecting sections have resistors connected in series between the unit power supply section and the first and second switching sections. With this structure, the structure of the detecting section can be simplified.

According to the input/output signal controller of the present invention, the first and second detecting sections control the selecting section so as not to select the receiving section when both end voltages are highest, which are the both end voltages of the detecting section when the transmission signal is outputted from the transmitting section. With this structure, further accurate detection of the transmission signal from the electronic device of the own machine is achieved.

According to the input/output signal controller of the present invention, the transmission line is the wired transmission line connected to the wireless transmission line. With this structure, the present invention can be implemented in the wired transmission line having the wireless transmission line in the middle.

According to the input/output signal controller of the present invention, the unit power supply section gives battery power based on a main battery power supplied from the main power supply section. With this structure, internal operation based on a battery power lower than the power supplied from the main power supply section is achieved.

According to the input/output signal control system of the present invention, a plurality of input/output signal controllers are connected to the main power supply line in parallel. With this structure, even if an internal resistor that can not be ignored exists on the main power supply line, the malfunction such that only the first or second detecting section performs detecting operation, thus being prone to detect an erroneous dominant state of the own machine, can be surely prevented.

According to the input/output signal control system of the present invention, the plurality of input/output signal controllers are dispersedly connected to the main power supply line in parallel. With this structure, the internal resistor of the main power supply line is easily increased. However, the malfunction at the side of the own machine can be surely prevented.

BEST MODE FOR CARRYING OUT THE INVENTION

Preferred embodiments of the present invention will be described hereafter, with reference to the drawings. Note that the same signs and numerals are assigned to the parts in common with those of a conventional example.

FIG. 1 is a schematic block diagram showing an embodiment of an input/output signal controller 3a of the present invention, corresponding to, for example, an input/output signal controller 3 of an electronic device A in FIG. 6 described above.

In FIG. 1, as shown in FIG. 6, a transmission line 1 is formed as 2-wire signal lines 1a and 1b, and is a CAN bus that performs bidirectional communication of a transmission signal such as a digital data signal among electronic devices A to C (not shown in FIG. 1. See FIG. 6). Both of the terminal ends of the signal lines 1a and 1b are terminated by, for example, terminal end resistors r1 and r2 of 120Ω, which is the same resistor value as the value of the impedance.

A vehicle electronic control system is formed by the electronic devices A to C, for example, in a vehicle, etc., including a control device of a combustion engine, a detection device, a searching device, and a storage device, etc. The input/output signal controller 3a is disposed between a device main body 5a and the transmission line 1 in the electronic device A, to control input/output of the transmission signal.

Input/output signal controllers 3b and 3c as will be described later are disposed in electronic devices B and C and have a structure similar to the input/output signal controller 3a.

A unit power supply section PWa is a publicly-known DC power supply section having a function of dropping a voltage to about 5V, which is the voltage of DC power from a main power supply section 25 of FIG. 5 as will be described later.

A source of a P channel FET transistor that forms a first switching section Qa1 is connected to a terminal Pa1 connected to a high potential (5V) side of the unit power supply section PWa, via a detection resistor Rat, and a drain of this transistor is connected in a forward direction to a line 1a, being one of the transmission line 1 via a protection diode Da1. An output side of a transmitting section 7a as will be described later is connected to a gate of the transistor.

A drain of a N-channel FET transistor that forms a second switching section Qa2 is connected in a forward direction to the other line 1b of the transmission line 1 via a protection diode Da2, with a source of this transistor connected to a terminal Pa2 via a detection resistor Ra2, and the terminal Pa2 connected to the low potential side (0V: common potential) of the unit power supply section PWa. The output side of the transmitting section 7a is connected to the gate of the transistor.

The transmitting section 7a is a driver circuit, which has a function of inputting the transmission signal transmitted from the aforementioned device main body 5a, and simultaneously setting the first and second switching sections Qa1 and Qa2 in ON/OFF operation (ON/OFF), and making the battery power from the unit power supply section PWa flow to the transmission line 1, to thereby set the transmission line 1 in a "dominant state" and set the transmission line 1 at a "H" level.

Note that "L" level for not allowing a battery-powered current to the transmission line 1, is a "recessive" state.

A receiving section 9a is connected to the lines 1a and 1b of the transmission line 1. The receiving section 9a has a function of inputting the "H" level of the transmission line 1 and amplifying and outputting it to a selecting section 15a. Namely, the receiving section 9a has a function of detecting and outputting the "dominant state" of the transmission line 1 as it is.

A comparator section 11a is connected to a connection point between the detection resistor Ra1 and the first switching section Qa1, and a first detecting section 13a is formed by the detection resistor Ra1 and the comparator section 11a.

The comparator section 11a has a function of controlling the selecting section 15a, by comparing a both end voltage v of the detection resistor Ra1 and a previously set reference voltage V, and when the both end voltage v exceeds the reference voltage V, detecting the "dominant state" of the transmission line 1 formed by an operation of only the transmitting section 7a, and outputting a detected control signal S1 to the selecting section 15a.

A comparator section 17a is connected to a connection point between the second switching section Qa2 and the detection resistor Ra2, and a second detecting section 19a is formed by the detection resistor Ra2 and the comparator section 17a.

Similarly to the comparator section 11a, the comparator section 17a has a function of controlling the selecting section 15a, by comparing the both end voltage v of the detection resistor Ra2 and the previously set reference voltage V, and when the both end voltage v exceeds the reference voltage V, detecting the "dominant state" of the transmission line 1 formed by the operation of only the transmitting section 7a, and based on this detection, outputting a control signal S2 to the selecting section 15a.

The selecting section 15a has a function of detecting the "dominant state" of the transmission line 1 formed by the operation of only the transmitting section 7a when control signals S1 and S2 are inputted from the first and second detecting sections 13a and 19a, and based on this detection, cutting the output of an output signal from the receiving section 9a to the device main body 5 by releasing the connection to the receiving section 9a.

Meanwhile, the selecting section 15a has a function of detecting the "recessive state" of the transmission line 1 when control signals S1 and S2 are not inputted from both the first and second detecting sections 13a and 19a, and based on this detection, selecting the connection to the receiving section 9a, and securing the output of the output signal from the receiving section 9a to the device main body 5. Namely, the selecting section 15a has a function of judging the "recessive state" of the transmission line 1 even if the control signal S1 or S2 of either one of the first and second detecting sections 13a and 19a is inputted.

Note that the transmitting section 7a, the receiving section 9a, the comparator sections 11a, 17a, and the selecting section 15a are operated based on the battery power supplied from the unit power supply section PWa.

Next, an operation of the input/output signal controller 3a of FIG. 1 will be described.

When the transmission signal is outputted to the transmitting section 7a from the device main body 5a of the electronic device A, the transmitting section 7a sets the first and second switching sections Qa1 and Qa2 in ON/OFF operation based on the transmission signal. Then, for example as shown in FIG. 2A, a pulse current flows to the side of the transmission line 1 from the unit power supply section PWa via the terminal Pa1, the detection resistor Rat, the first switching section Qa1, and the protection diode Da1. Meanwhile, the pulse current flows to the terminal Pa from the side of the transmission line 1 via the protection diode Da2, the second switching section Qa2, and the detection resistor Ra2. Thus, the transmission signal is transmitted to the side of the transmission line 1, and the transmission line 1 is thereby set at "H" level and set in "dominant state".

By setting the transmission line in the "dominant state", the transmission signal from the electronic device A is captured by other electronic devices B and C. Note that in order to identify the electronic devices A to C to which the transmission signal is transmitted, for example addresses or identification marks of the electronic devices A to C may be assigned to the transmission signal.

At this time, when the "dominant state" is set by only the operation of the electronic device A, the battery-powered current flowing through the transmission line 1 by the electronic device A, flows through the detection resistor Ra2 via the detection resistor Ra1 and the terminal end resistors r1 and r2 of both ends, and therefore a large potential difference is generated in both ends of the detection resistors Ra1 and Ra2.

Therefore, in the comparator sections 11a and 17a, if the reference voltage V is set so that both end voltage v of both the detection resistors Ra1 and Ra2 exceeds the reference voltage V, the both end voltage v of the detection resistors Ra1 and Ra2 is added to the comparator sections 11a and 17a and is compared with the reference voltage V. The first and second detecting sections 13a and 19a detect the output of the transmission signal from the transmitting section 7a and output the control signals S1 and S2 to the selecting section 15a, and the selecting section 15a controls the release of the connection to the receiving section 9a.

Meanwhile, the both end voltage v of the detection resistors Ra1 and Ra2 is 0V when the first and second switching sections Qa1 and Qa2 are set in OFF operation, thus not allowing the control signals S1 and S2 to be outputted from the comparator sections 11a and 17a, and the selecting section 15a secures the connection to the receiving section 9a. Therefore, the transmission signal inputted into the receiving section 9a from the transmission line 1 is outputted to the device main body 5 via the selecting section 15a.

Further, when the first and second switching sections Qa1 and Qa2 of the electronic device A are set in ON operation in a state of the "dominant state" of the transmission line 1 by operations of other electronic device B or C, the battery-powered current also flows through the detection resistors Ra1 and Ra2, to thereby cause a potential difference to be generated in both ends.

However, in such a state, the potential difference in both ends of both the detection resistors Ra1 and Ra2 is smaller than the reference voltage V compared with a case that the first and second switching sections Qa1 and Qa2 are set in ON operation by the operation of only the electronic device A, thus not allowing the control signals S1 and S2 to be outputted from the comparator sections 11a and 17a, and the selecting section 15a secures the connection to the receiving section 9a. The transmission signal inputted into the receiving section 9a from the transmission line 1 is outputted to the device main body 5a via the selecting section 15a.

Namely, in the structure of the present invention, even if a plurality of electronic devices B, C, including the electronic device A are set in the "dominant state", every ½ of the current flowing through the terminal end resistors r1 and r2 also flows through the electronic device A itself and other electronic device B or C, thus reducing the voltage drop which is generated in the detection resistors Ra1 and Ra2.

Note that when the transmission line 1 is set in the "dominant state" by the operations of the electronic devices B, C including the electronic device A, it may be possible to identify any one of the electronic devices A to C, is used to set the transmission line 1 in the "dominant state", based on the transmission signal outputted from the own machine, for example, at the side of the device main body 5a.

FIG. 3 shows a variation of the both end voltage v (v1>v2>v3) of the detection resistors Ra1 and Ra2, in "a dominant state of the own machine" and "a recessive state of the own machine" wherein the own machine is used to set the transmission line 1 in the "dominant state" and the "recessive state", and in "a dominant state of other device" and "a recessive state of other device" wherein other device is used to set the transmission line 1 in the "dominant state" and the "recessive state".

As described above, the input/output signal control device 3a of the present invention comprises:

the transmitting section 7a that outputs the transmission signal to the side of the 2-wire transmission line 1 connected to terminal end resistors r1 and r2 of both ends;

the first switching section Qa1 that outputs the transmission signal transmitted from the transmitting section 7a by switching ON/OFF of the battery power supplied from the unit power supply section PWa, being the first switching section Qa1 connected between the high potential side of the unit power supply section PWa and the line 1a being one of the transmission line 1;

the second switching section Qa2 that outputs from the transmission line 1 the transmission signal transmitted from the transmitting section 7a by switching ON/OFF of the supplied battery power simultaneously with the first switching section Qa1, being the second switching section Qa2 connected between the other line 1b of the transmission line 1 and the low potential side of the unit power supply section PWa;

the receiving section 9a that receives the transmission signal from the transmission line 1;

the first detecting section 13a connected between the high potential side of the unit power supply section PWa and one of the transmission line 1, for detecting the output of the transmission signal from the transmitting section 7a flowing through the first switching section Qa1;

the second detecting section Qa2 connected between the other line of the transmission line 1 and the low potential side of the unit power supply section PWa, for detecting the output of the transmission signal from the transmitting section 7a flowing through the second switching section Qa2; and the selecting section 15a that selects the receiving section 9a when the output of the transmission signal from the transmitting section 7a is not detected by either one of the first and second detecting sections 13a and 19a.

Therefore, according to the present invention, when the both end voltage of the detection resistors Ra1 and Ra2 with the transmission signal outputted from the transmitting section 7a, is higher than a previously set voltage, the selecting section 15a does not select the receiving section 9a, and when the both end voltage of the detection resistors Ra1 and Ra2 is low, the selecting section 15a selects the receiving section 9a. Then, when only the electronic device A of the own machine is used to output the transmission signal to the transmission line 1 and set the transmission line 1 in the "dominant state", based on this detection, the transmission signal is hardly outputted from the receiving section 9a, and the malfunction of the electronic device A is prevented.

In addition, the output of the transmission signal from the transmitting section 7a flowing through the first and second switching sections Qa1 and Qa2 is detected by the detection resistors Ra1 and Ra2. Therefore, structures of the first and second detecting sections 13a and 19a can be simplified.

In the input/output signal controller of the present invention, the selecting section 15a is controlled to select the receiving section 9a when both end voltages of the detection resistors Ra1 and Ra2 are highest when the transmission signal is outputted from the transmitting section 7a. With this structure, it is easy to detect the "dominant state" of the transmission line 1, which is formed by the operation of only the electronic device of the own machine.

Further, according to the present invention, a largest voltage drop occurs when the dominant state is formed by the operation of only the electronic device A. Therefore, if the reference voltage V of the comparator section 11a is set to a value below this voltage value, the output from the receiving section 9a can be surely suppressed by controlling the selecting section 15a only when the both end voltage exceeds the set value.

Then, the aforementioned first and second detecting sections 13a and 19a are not limited to a structure comprising the detection resistors Ra1 and Ra2 and the comparator sections 11a and 17a. However, with a structure comprising the detection resistors Ra1 and Ra2 connected in series between the unit power supply section PWa and the first and second switching sections Qa1, Qa2, and a structure of releasing (cutting) the connection to the receiving section 9a by controlling the selecting section 15a based on large/small of the both end voltages generated in the detection resistors Ra1 and Ra2, there is an advantage that the structure of the detecting section can be simplified.

Incidentally, in the aforementioned input/output signal controller 3a of the present invention, explanation is given for the case that the transmission line 1 is a wired transmission line. However, in the input/output signal controller 3a of the present invention, it may be also possible to provide the transmission line 1 connected to the wireless transmission line.

FIG. 4 is a view showing a structure that the wired transmission line 1 is connected by remote coupler devices 21 and 23 as wireless transmission lines.

The remote coupler devices 21 and 23 have the same structures, and although not shown, are formed by having a modulation section, a resonance section, and a demodulating section, and are connected to the transmission line 1. In addition to the aforementioned constituent elements, the remote coupler devices 21 and 23 have, for example, a unit power supply section, etc. However, the unit power supply section is not an essential section of the present invention and therefore explanation and figure description thereof are omitted.

The remote coupler devices 21 and 23 have a function of oscillating a high frequency signal of 100 MHz for example, by the modulation section to thereby modulate this high frequency signal with the transmission signal (pulse signal), and radiating it to outside (remote coupler devices 21 and 23) by using the resonance section. The modulated high frequency signal is a signal, for example, as shown in FIG. 3B (note that this figure is exaggerated).

The remote coupler devices 21 and 23 have a function of resonating with the modulated high frequency signal radiated from the external remote coupler devices 21 and 23 by using the resonance section to thereby induce the high frequency signal, and demodulating the high frequency signal and outputting the transmission signal (pulse signal) by using the demodulating section.

Thus, the input/output signal controller 3a of the present invention can also be implemented on the wired transmission line 1 connected to other wireless transmission line, and can be implemented in a wider use range, thus making it possible to obtain the aforementioned advantage.

Next, an embodiment of the input/output signal control system using the aforementioned input/output signal controllers 3a, 3b, 3c will be described.

In FIG. 5, the input/output signal controller 3a has a structure shown in FIG. 1, and the input/output signal controller 3b has the same structure as the structure of the input/output signal controller 3a including the unit power supply section PWa, the detection resistors Ra1, Ra2, the first and second switching sections Qa1, Qa2, the protection diodes Da1, Da2, the transmitting section 7a, the receiving section 9a, the comparator sections 11a, 17a, the first and second detecting sections 13a and 19a, and the selecting section 15a.

Namely, the input/output signal controller 3b has a similar circuit structure, having similar unit power supply section PWb, detection resistors Rb1 and Rb2, first and second switching sections Qb1, Qb2, protection diodes Db1, Db2, transmitting section 7b, receiving section 9b, comparator sections 11b, 17b, first and second detecting sections 13b, 19b, and selecting section 15b similar to those of the input/output signal controller 3a.

Note that in FIG. 5, the first and second detecting sections 13a, 19a, 13b, 19b are not shown, and Da3 and Db3 in this figure indicate shottky diodes inserted between the terminals Pa2, Pb2 and a main power supply line 27b as will be described later, and are provided for reverse connection protection.

The same thing can be said for the input/output signal controller 3c as the input/output signal controllers 3a and 3b, and therefore its detailed figure is omitted.

The input/output signal controllers 3a and 3b are operated by connecting unit power supply sections PWa and Pwb to main power supply lines 27a and 27b extending from the main power supply section 21. The same thing can be said for the input/output signal controller 3c.

The main power supply section 25 converts a commercial AC power of 100V to, for example, DC voltage of about 24V, and supplies +24V (V+) by the main power supply line 27a, and supplies −24V (V−) by the main power supply line 27b, so that a battery-powered current (load current) flows through the main power supply line 27a, the input/output signal controllers 3a to 3c, and the main power supply line 27b.

The input/output signal controllers 3a to 3c are dispersedly connected to the main power supply lines 27a and 23b in parallel at a fixed interval, and function as a load connected to the main power supply section 25 via the main power supply lines 27a and 27b having internal resistors r3 and r4.

Namely, in FIG. 5, the input/output signal controller 3a is connected at a position closest to the main power supply section 25, and other input/output signal controllers 3b and 3c are dispersedly connected to the main power supply section 25 via the internal resistors r3 and r4.

Next, the operation of the input/output signal control system according to the present invention will be described.

In FIG. 5, if the battery-powered current flows through the input/output signal controllers 3a to 3c, the voltage drop is generated due to the internal resistors r3 and r4 of the main power supply lines 27a and 27b. Therefore, owing to the operation of the input/output signal controllers 3b and 3c, a potential of the terminal Pb2 (0V) at the low potential side becomes higher than a potential of the terminal Pa2 (0V) at the low potential side of the input/output signal controller 3a, by an amount of the voltage drop of the internal resistor r4.

Therefore, as described above, when potentials are different from each other between terminals Pa1 and Pa2 at the high potential side of the input/output signal controllers 3a and 3b and a potential difference between them becomes large, there is a high possibility that the dominant state of the own machine can not be accurately detected only by the detection resistors Ra1 and Rb2 at the side of the terminal Pb2 or only by the detection resistors Ra1 and Rb1 at the high potential side.

Namely, even when both the input/output signal controllers 3a and 3b are set in the dominant state, since the potential of the terminal Pb2 of the input/output signal controller 3b is high, the current flowing though the detection resistor Ra2 of the input/output signal controller 3a is larger than the current flowing through the detection resistor Rb2 of the input/output signal controller 3b.

Then, the voltage drop caused by the detection resistor Ra2 becomes large due to such a large difference in currents, and when exceeding a comparison value, it is easily erroneously recognized that only the input/output signal controller 3a itself is set in the dominant state.

Further, since the potential of the terminal Pb2 of the input/output signal controller 3b is high, the potential of the terminal Pb1 at the high potential side is also high.

Therefore, the current flowing through the detection resistor Rb1 of the input/output signal controller 3b is larger than the current flowing through the detection resistor Ra1 of the input/output signal controller 3a. The voltage drop caused by the detection resistor Rb1 becomes large due to such a large difference in currents, and when exceeding a comparison value, it is easily erroneously recognized that only the input/output signal controller 3b is set in the dominant state.

Note that when reversing the connection positions of the input/output signal controllers 3a and 3b connected to the main power supply section 25 as a load, the operation is reversed.

In such a state, when only one of the input/output signal controllers 3a and 3b is set in the dominant state, in other words, when only one device is set in the dominant state, erroneous recognition can be prevented if both the detection resistor Ra1 (Rb1) and Ra2 (Rb2) are set in the dominant state in the device set in the dominant state.

Therefore, only in a case that only the own machine is set in the dominant state in the aforementioned input/output signal controllers 3a and 3b, it is judged that only the own machine is set in the dominant state. Thus, accurate detection is possible.

As described above, in the individual input/output signal controllers 3a to 3c, when AND conditions of detection results are fulfilled by both comparator sections 11a, 17a, and 11b, 17b, the selecting sections 15a and 15b select the receiving sections 9a and 9b. Therefore, the accurate detection in the dominant state can be secured.

Thus, in the input/output signal control system of the present invention, when the individual input/output signal controllers 3a to 3c are connected to the main power supply lines 27a and 27b extending from the main power supply section 25 in parallel, the generation of the erroneous operation can be easily suppressed even if the voltage drop occurs in the main power supply line during operation of supplying power, due to the internal resistor that can not be ignored which exists in the main power supply lines 27a and 27b.

Particularly, the present invention is useful in a structure that the individual input/output signal controllers 3a to 3c are dispersedly connected to the main power supply lines 27a and 27b at a fixed interval in parallel.

Note that the aforementioned input/output signal controllers 3a to 3c of the present invention have a structure that the individual unit power supply sections PWa and PWb perform supplying battery power based on the main battery power supplied from the main power supply section 25, to thereby cause internal operation based on a battery power of 5V which is lower than the main battery power of 24V supplied from the main power supply section 25.

BRIEF DESCRIPTION OF THE DRAWINGS

FIG. 6A and FIG. 6B are block diagrams showing an electronic control system and an electronic device, as references of the present invention.

DESCRIPTION OF SIGNS AND NUMERALS

Figure 1:
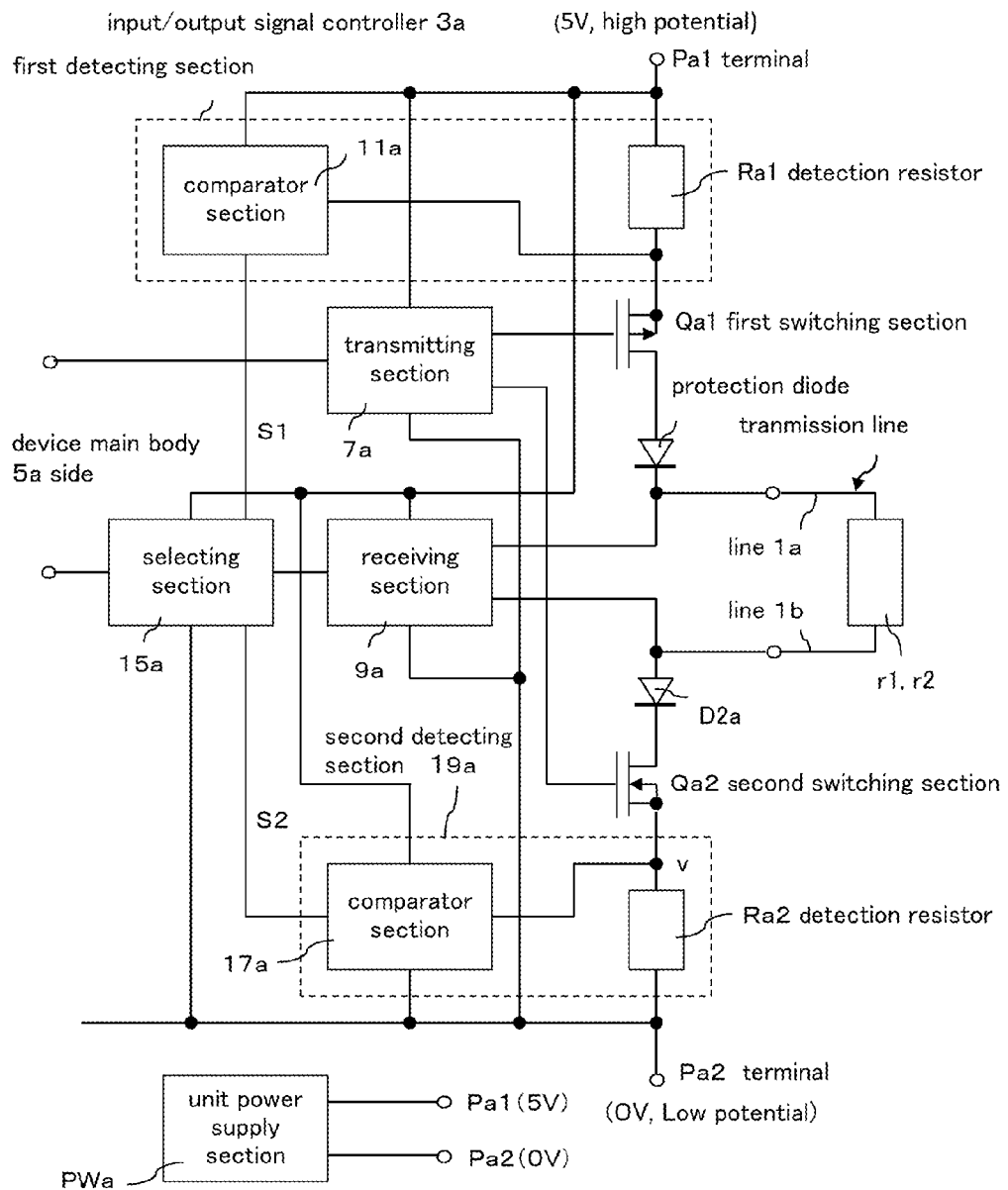
FIG. 1 is a block diagram showing an embodiment of an input/output signal controller according to the present invention.
Figure 2:
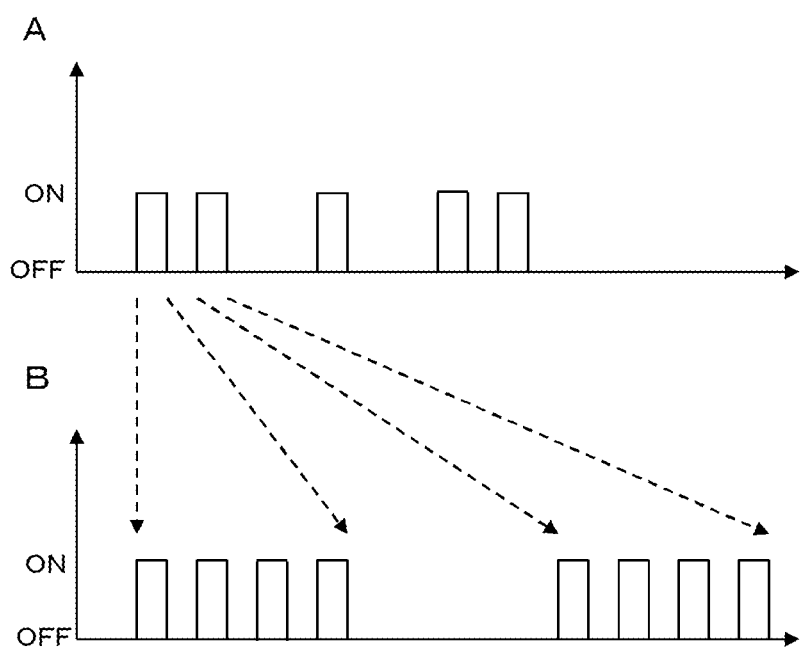
FIG. 2 is a view explaining an operation of the input/output signal controller according to the present invention.
Figure 3:
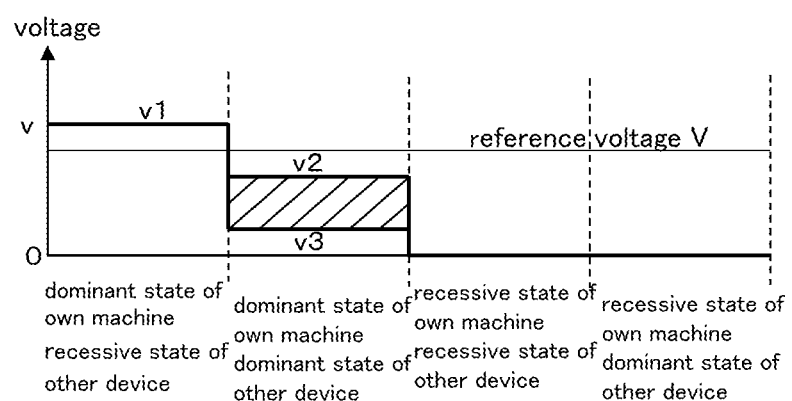
FIG. 3 is a view explaining the operation of the input/output signal controller according to the present invention.
Figure 4:
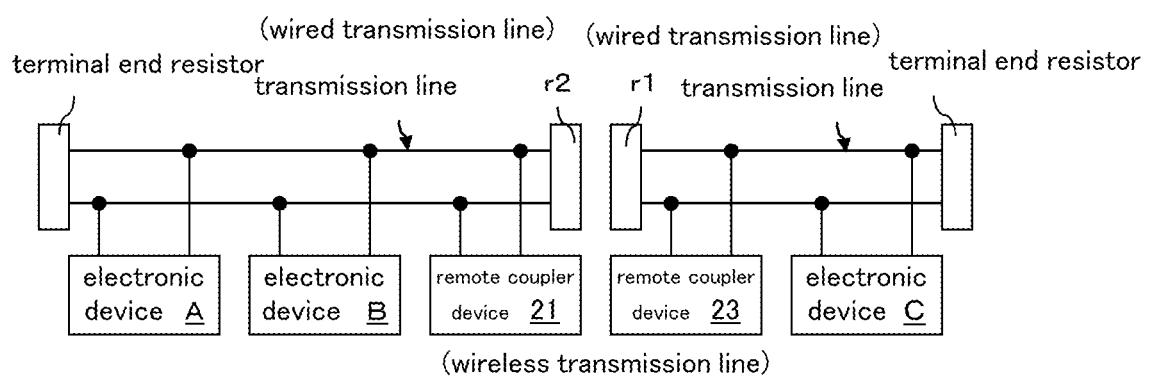
FIG. 4 is a block diagram showing an electronic control system for explaining other structure of the input/output signal controller according to the present invention.
Figure 5:
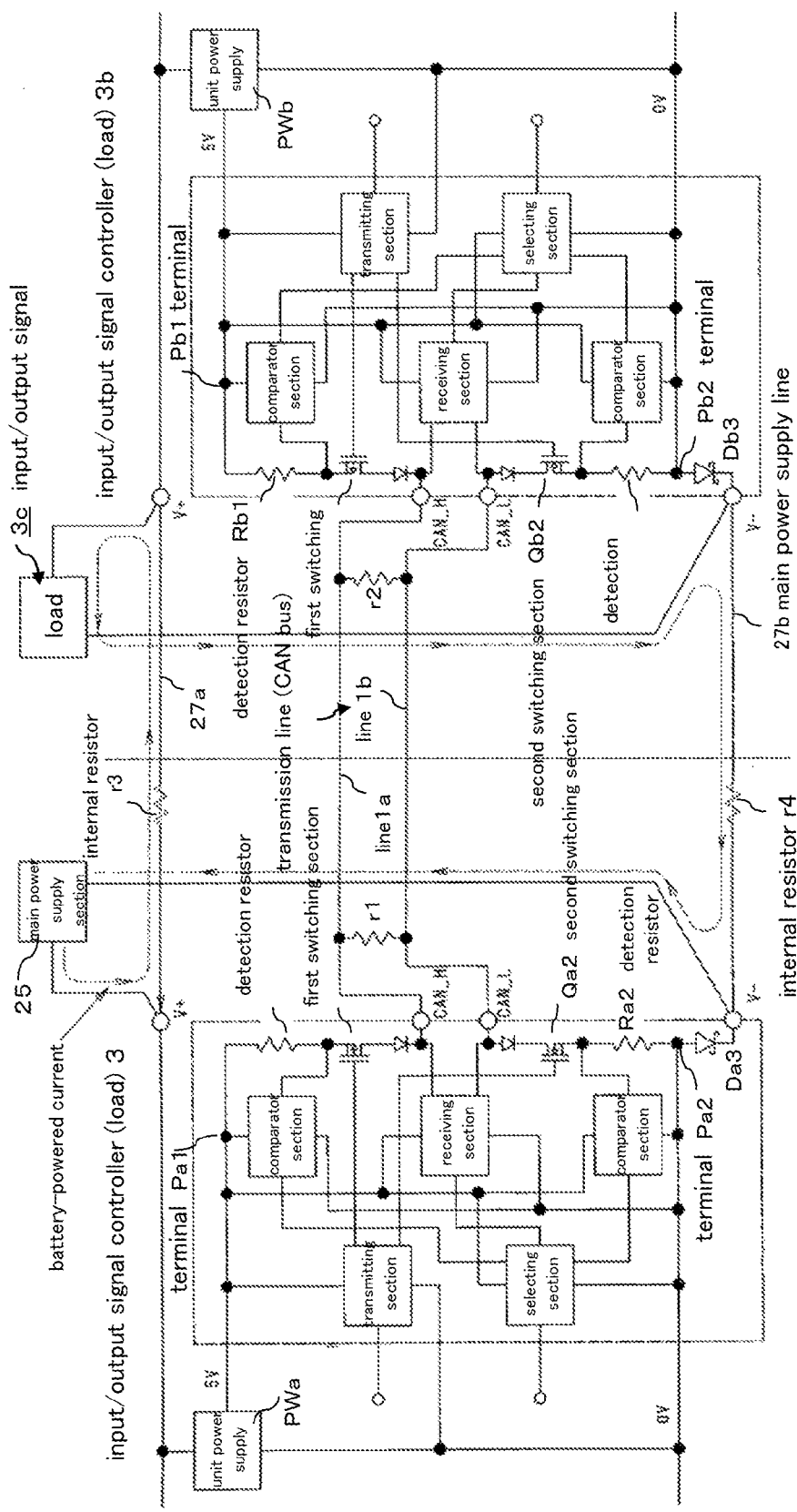
FIG. 5 is a block diagram showing an embodiment of the input/output signal control system according to the present invention.
Figure 7:
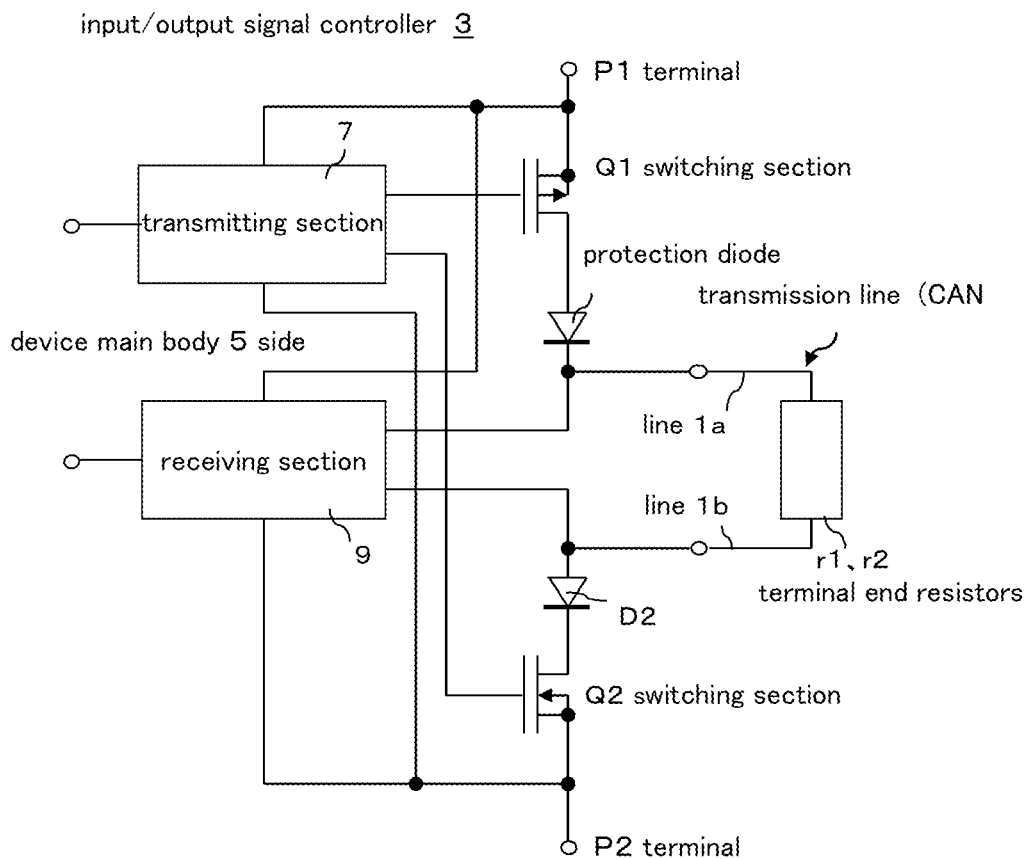
FIG. 7 is a block diagram showing a conventional input/output signal controller in FIG. 6.

1 Transmission line (CAN bus, wired transmission line)
1a, 1b Lines
3, 3a, 3b, 3c Input/output signal controllers (loads)
5, 5a, 5b, 5c Device main bodies
7, 7a, 7b Transmitting sections
9, 9a, 9b Receiving sections
11a, 11b, 17a, 17b Comparator sections (detecting sections)
13a First detecting section
15a, 15b Selecting sections
19a Second detecting section
21, 23 Remote coupler devices (wireless transmission lines)
25 Main power supply section
27a, 27b Main power supply lines
A, B, C Electronic devices
D1, D2, Da1, Da2, Da3, Db1, Db2, Db3 Diodes
P1, P2, Pa1, Pa2 Terminals
PWa, PWb Unit power supply sections
Q1, Q2 Switching sections
Qa1, Qa2 First switching sections
Qa2, Qb2 Second switching sections
Ra1, Ra2, Rb1, Rb2 Detection resistors (detecting sections)
R1, r2 Terminal resistors

The invention claimed is:

1. An input/output signal controller comprising:
a transmitting section that outputs a transmission signal to the side of a 2-wire transmission line connected to terminal end resistors of both ends;
a first switching section that outputs the transmission signal transmitted from the transmitting section by switching ON/OFF of a battery power supplied from a unit power supply section, being the first switching section connected between a high potential side of the unit power supply section and one of the transmission line;
a second switching section that outputs from the transmission line the transmission signal transmitted from the transmitting section by switching ON/OFF of the supplied battery power simultaneously with the first switching section, being the second switching section connected between the other line of the transmission line and a low potential side of the unit power supply section;
a receiving section that receives the transmission signal from the transmission line;
a first detecting section connected between the high potential side of the unit power supply section and one of the transmission line, for detecting an output of the transmission signal from the transmitting section flowing through the first switching section;
a second detecting section connected between the other line of the transmission line and the low potential side of the unit power supply section, for detecting the output of the transmission signal from the transmitting section flowing through the second switching section; and a selecting section that selects the receiving section when the output of the transmission signal from the transmitting section is not detected by either one of the first and second detecting sections.

2. The input/output signal controller according to claim 1, wherein the first and second detecting sections have resistors connected in series between the unit power supply section and the first or second switching section.

3. The input/output signal controller according to claim 1, wherein the first and second detecting sections control a selecting section so as not to select the receiving section when both end voltages are highest, which are the both end voltages of the first and second detecting sections when the transmission signal is outputted from the transmitting section.

4. The input/output signal controller according to claim 1, wherein the transmission line is a wired transmission line connected to a wireless transmission line.

5. The input/output signal controller according to claim 1, wherein the unit power supply section supplies battery power based on a main battery power supplied from a main power supply line extending from a main power supply section.

6. An input/output signal control system according to claim 5, wherein a plurality of input/output signal controllers are connected to the main power supply line in parallel.

7. The input/output signal control system according to claim 6, wherein the plurality of input/output signal controllers are dispersedly connected to the main power supply line in parallel.

* * * * *